US 8,406,516 B2

(12) United States Patent
Yamamoto

(10) Patent No.: US 8,406,516 B2
(45) Date of Patent: Mar. 26, 2013

(54) IMAGE PROCESSING APPARATUS, IMAGE PROCESSING SYSTEM, IMAGE PROCESSING METHOD AND IMAGE PROCESSING PROGRAM FOR PERFORMING COLOR CLASSIFICATION OF IMAGE DATA

(75) Inventor: Toshitsugu Yamamoto, Takatsuki (JP)

(73) Assignee: Konica Minolta Business Technologies, Inc. (JP)

( * ) Notice: Subject to any disclaimer, the term of this patent is extended or adjusted under 35 U.S.C. 154(b) by 271 days.

(21) Appl. No.: 12/829,618

(22) Filed: Jul. 2, 2010

(65) Prior Publication Data

US 2011/0007966 A1     Jan. 13, 2011

(30) Foreign Application Priority Data

Jul. 7, 2009   (JP) .................. 2009-160697

(51) Int. Cl.
 *G06K 9/00*   (2006.01)
 *G06K 9/62*   (2006.01)
 *G06K 9/34*   (2006.01)
(52) U.S. Cl. ...................... 382/165; 382/224
(58) Field of Classification Search .......... 382/162, 382/164, 165, 167, 173, 224–226, 228; 358/1.1, 358/1.9, 2.1, 3.04, 515, 518; 348/279, 395.1; 345/589, 591, 604
See application file for complete search history.

(56) References Cited

U.S. PATENT DOCUMENTS

| 7,528,991 B2 * | 5/2009 | Naccari et al. .......... 358/1.9 |
| 7,668,365 B2 * | 2/2010 | Imai .................. 382/162 |
| 7,925,083 B2 * | 4/2011 | Johnson ............... 382/162 |
| 8,131,066 B2 * | 3/2012 | Hua et al. ............. 382/160 |
| 2009/0324065 A1 * | 12/2009 | Ishida et al. ........... 382/164 |
| 2011/0007966 A1 * | 1/2011 | Yamamoto ............. 382/165 |

FOREIGN PATENT DOCUMENTS

| JP | 3-214987 A | 9/1991 |
| JP | 4-189089 A | 7/1992 |
| JP | 4-189090 A | 7/1992 |
| JP | 4-189091 A | 7/1992 |
| JP | 6-164411 A | 6/1994 |
| JP | 10-40364 A | 2/1998 |
| JP | 2005-229620 A | 8/2005 |
| JP | 2005-269271 A | 9/2005 |
| JP | 2008-048302 A | 2/2008 |

OTHER PUBLICATIONS

Japanese Office Action, Notice of Grounds of Rejection for Japanese patent application No. 2009-160697 mailing date of Sep. 18, 2012 with English translation.

* cited by examiner

*Primary Examiner* — Amir Alavi
(74) *Attorney, Agent, or Firm* — Cantor Colburn LLP

(57) ABSTRACT

An image processing apparatus MFP includes a memory for storing color data of a plurality of picture elements together with a correlation to identification information for identifying each picture element, and storing a reference value and a statistical value for each of a predetermined number of baskets; a classifying unit for classifying each of the plurality of picture elements into one of the baskets based on the color data and the reference value corresponding to the basket; a calculating unit for calculating the statistical value and the reference value of the basket accommodating the classified picture element based on the color data corresponding to the picture element; and a determining unit for determining a representative color of each basket based on the statistical value, and outputting the representative color of each basket and a result of the classification of each picture element.

19 Claims, 11 Drawing Sheets ate image, using a centroid of the eventually formed boxes
IMAGE PROCESSING APPARATUS, IMAGE PROCESSING SYSTEM, IMAGE PROCESSING METHOD AND IMAGE PROCESSING PROGRAM FOR PERFORMING COLOR CLASSIFICATION OF IMAGE DATA This application is based on Japanese Patent Application No. 2009-160697 filed with the Japan Patent Office on Jul. 7, 2009, the entire content of which is hereby incorporated by reference.

BACKGROUND OF THE INVENTION

1. Field of the Invention

The present invention relates to an image processing apparatus, an image processing system, an image processing method and an image processing program, and particularly to an image processing system, an image processing method and an image processing program for compressing image data.

2. Description of the Related Art

Techniques for compressing image data have been known. A BTC (Block Truncation Coding) compression method is an example of such a technique.

Further, coding circuits for image data have been disclosed, e.g., in Japanese Laid-Open Patent Publication Nos. 4-189089, 4-189090 and 4-189091. According to Japanese Laid-Open Patent Publication Nos. 4-189089, 4-189090 and 4-189091, the encoding circuit for the image data transmits, as addition codes, a median of the picture element data and data of a half dynamic range from which high-order bits are removed, and thereby reduces the number of bits of the addition code to be transmitted.

Also, Japanese Laid-Open Patent Publication No. 3-214987 has disclosed a high-efficiency coding device that compresses a data quantity of addition data that occurs in block encoding. According to Japanese Laid-Open Patent Publication No. 3-214987, the high-efficiency coding device includes a blocking circuit blocking input digital image data, a block coding circuit coding image data in a block appropriately for the dynamic range of each block, a sensing circuit sensing a maximum value of the addition code of each block used in the block coding circuit over a predetermined number of blocks, a determining circuit determining the number of bits assigned to the addition codes for a period of a predetermined number of blocks based on an output of the sensing circuit, and a changing circuit changing the number of bits of the addition code based on the output of the determining circuit. The output of the block coding circuit, the addition code provided from the changing circuit and a bit number identifying code provided from the determining circuit are transmitted so that the data quantity of the addition code can be compressed.

Japanese Laid-Open Patent Publication No. 6-164411 has disclosed an adaptive dynamic range coding and encoding device. According to Japanese Laid-Open Patent Publication No. 6-164411, the device divides input signals into blocks, and performs adaptive quantization on signals in each block according to a dynamic range that represents a difference between maximum and minimum values of the signals in the block. Also, it can also decode the adaptively quantized information to obtain the original input signal.

Japanese Laid-Open Patent Publication No. 10-040364 has disclosed a color image producing method. According to Japanese Laid-Open Patent Publication No. 10-040364, an image processing apparatus prepares a box of a color space for representing a full-color image that is input through an image reading device, using initial representative colors of N in number, and puts each of the colors presenting the color image into the box. Colors other than the initial representative colors are prepared as a new box, and the boxes are merged so that the boxes may be always N in number and the boxes may have a minimum volume. The apparatus produces approximate image, using a centroid of the eventually formed boxes of N in number as a representative color, and provides it to an image output apparatus.

In the BTC compression, however, the colors in the block are classified into colors of n in number that is smaller than a number m of picture elements in the block, records color information (representative value) about n colors as well as information about a correlation between each picture element and color (representative values), and thereby the image is compressed. Therefore, it is necessary to determine a reference for color classification by scanning the whole data in the blocks. It is necessary to obtain the representative value from the classified picture element values. For implementing the color classifying processing in hardware according to a conventional technique, therefore, the whole image data in the blocks must be held in the hardware at least until the representative value of each group is calculated after the end of the color classifying processing. This decreases the image processing speed.

For holding the image data in the blocks, the image processing apparatus must include a line memory for holding, on a band-by-band basis, the image data containing blocks. However, the memory that can hold the image data on the band-by-band basis has a large capacity and thus is expensive. As the block size increases for improving a compressibility, the required size of the line memory increases.

SUMMARY OF THE INVENTION

The present invention has been made for overcoming the above problems, and an object of the invention is to increase a speed of compression (color classification) of image data and to lower a cost of an image processing apparatus for performing the compression (color classification) of the image data.

According to an aspect, the invention provides an image processing apparatus for performing color classification of image data by classifying a plurality of picture elements into a predetermined number of baskets. The image forming apparatus includes a memory for storing color data of each of a plurality of picture elements together with a correlation to identification information for identifying each of the plurality of picture elements, and storing a reference value and a statistical value for each of the predetermined number of baskets; a classifying unit for classifying each of the plurality of picture elements into one of the baskets based on the color data and the reference value corresponding to the basket; a calculating unit for calculating the statistical value and the reference value of the basket accommodating the classified picture element based on the color data corresponding to the picture element; and a determining unit for determining a representative color of each of the baskets based on the statistical value, and outputting the representative color of each of the baskets and a result of the classification of each of the picture elements.

Preferably, the calculating unit calculates the statistical value and the reference value of the basket containing a new classified picture element based on the color data of the picture element newly classified into the basket as well as the statistical value and the reference value corresponding to the plurality of picture elements already classified into the basket.

Preferably, the classifying unit includes a first determining unit for determining, for each of the plurality of picture elements, whether the color data is to be classified into one of the baskets or not, based on the reference value of the one of the baskets; a second determining unit for determining whether the basket not yet correlated to the reference value is present or not, when the color data is not classified into any one of the baskets; a calculating unit for calculating a distance between the reference values and a distance between the reference value and the color data, when all the baskets are correlated to the reference values; and a coupling unit for coupling the two baskets together corresponding to the distance between the reference values when the distance between the reference values is the smallest of the distances. The classifying unit operates; when the color data is to be classified into any one of the baskets, to classify the picture element in question into the basket corresponding to the reference value; when the basket not correlated to the reference value is present, to classify the picture element in question into the basket; and when the distance between the reference value and the color data is the smallest of the distances, to classify the picture element in question into the basket corresponding to the distance.

Preferably, the image data includes the plurality of blocks containing the plurality of picture elements. The memory stores temporary information about the predetermined number of baskets per block. The classifying unit successively classifies the picture elements along a line extending through the plurality of blocks based on the corresponding temporary information.

Preferably, the memory stores the temporary information relating to a first line in a first block forming the image data while the classifying unit is classifying the picture elements in the first line in a second block forming the image data.

Preferably, the memory stores, as the temporary information, the basket of the classification destination corresponding to the identification information as well as the reference value and the statistical value of each of the predetermined number of baskets.

Preferably, the memory stores, as the temporary information, the basket of the classification destination corresponding to the identification information used for identifying each of the plurality of picture elements as well as the statistical value of each of the predetermined number of baskets. The classifying unit calculates the reference value for each of the predetermined number of baskets, based on the statistical value when the classification of the picture elements in the second line in the first block is to be performed.

Preferably, the memory stores, as the temporary information, the basket of the classification destination corresponding to the identification information used for identifying each of the plurality of picture elements as well as the statistical value of each of the predetermined number of baskets. The classifying unit calculates the statistical value for each of the predetermined number of baskets, based on the reference value when the classification of the picture elements in the second line in the first block is to be performed.

Preferably, the statistical value relating to each of the predetermined number of baskets includes a minimum value and a maximum value of the color data of the picture elements classified into the basket.

Preferably, the statistical value relating to each of the predetermined number of baskets includes a cumulative total of the color data of the picture elements classified into the basket.

Preferably, the statistical value relating to each of the predetermined number of baskets includes an average of the color data of the picture elements classified into the basket.

Preferably, the statistical value relating to each of the predetermined number of baskets includes a maximum value and a minimum value of the color data of the picture elements classified into the basket.

Preferably, the memory stores a representative color of each of the baskets and a result of the classification of the picture elements.

Preferably, the image processing apparatus further includes a reproducing unit for reproducing the image based on the representative color of each of the baskets and the result of the classification of each of the picture elements.

According to another aspect, the invention provides an image processing system including the image processing apparatus described above, and an image recording device for storing the representative color of each of the baskets and the result of the classification of each of the picture elements provided from the image processing apparatus.

According to still another aspect, the invention provides an image processing system including the image processing apparatus described above, and an image reproducing device for reproducing an image based on the representative color of each of the baskets and the result of the classification of each of the picture elements provided from the image processing apparatus.

According to another aspect, the invention provides an image processing system including the image processing apparatus described above; an image recording device for storing the representative color of each of the baskets and the result of the classification of each of the picture elements provided from the image processing apparatus; and an image reproducing device for reproducing an image based on the representative color of each of the baskets and the result of the classification of each of the picture elements provided from the image processing apparatus.

According to further aspect, the invention provides an image processing method in an image processing apparatus including a memory and a processor. The image processing method includes the steps of causing the processor to store, in the memory, color data of the picture elements together with a correlation to identification information for identifying each of the plurality of picture elements; storing, by the processor, in the memory, a reference value and a statistical value for each of the predetermined number of baskets; classifying, by the processor, each of the plurality of picture elements into one of the baskets based on the color data and the reference value corresponding to the basket; calculating, by the processor, the statistical value and the reference value of the basket accommodating the classified picture element based on the color data corresponding to the picture element; determining, by the processor, a representative color of each of the baskets based on the statistical value; and outputting, by the processor, the representative color of each of the baskets and a result of the classification of each of the picture elements.

According to further aspect, the invention provides a computer-readable recording medium storing an image processing program for causing an image processing apparatus including a memory and a processor to perform image processing. The image processing program causes the processor to execute the steps of storing, in the memory, color data of each of a plurality of picture elements together with a correlation to identification information for identifying each of the plurality of picture elements; storing, in the memory, a reference value and a statistical value for each of the predetermined number of baskets; classifying each of the plurality of picture elements into one of the baskets based on the color data and the reference value corresponding to the basket; calculating the statistical value and the reference value of the basket accommodating the classified picture element based on the color data corresponding to the picture element; determining a representative color of each of the baskets based on the statistical value; and outputting the representative color of each of the baskets and a result of the classification of each of the picture elements.

According to the invention as describe above, the invention provides the image processing apparatus, image processing system, image processing method and image processing program that can increase the speed of the image data compression or can lower the cost of the image processing apparatus.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the invention will now be described with reference to the drawings. In the following description, the same or corresponding parts and components bear the same reference numbers and the same names, and achieve the same functions.

In an embodiment, an MFP (Multi-Function Peripheral) having a copying function, a scanning function and an FAX function in an integrated fashion will be representatively discussed as an image processing apparatus according to the invention. First, an operation summary of an image processing apparatus MFP according to the embodiment will be described below.

<Operation Summary>

Figure 1:
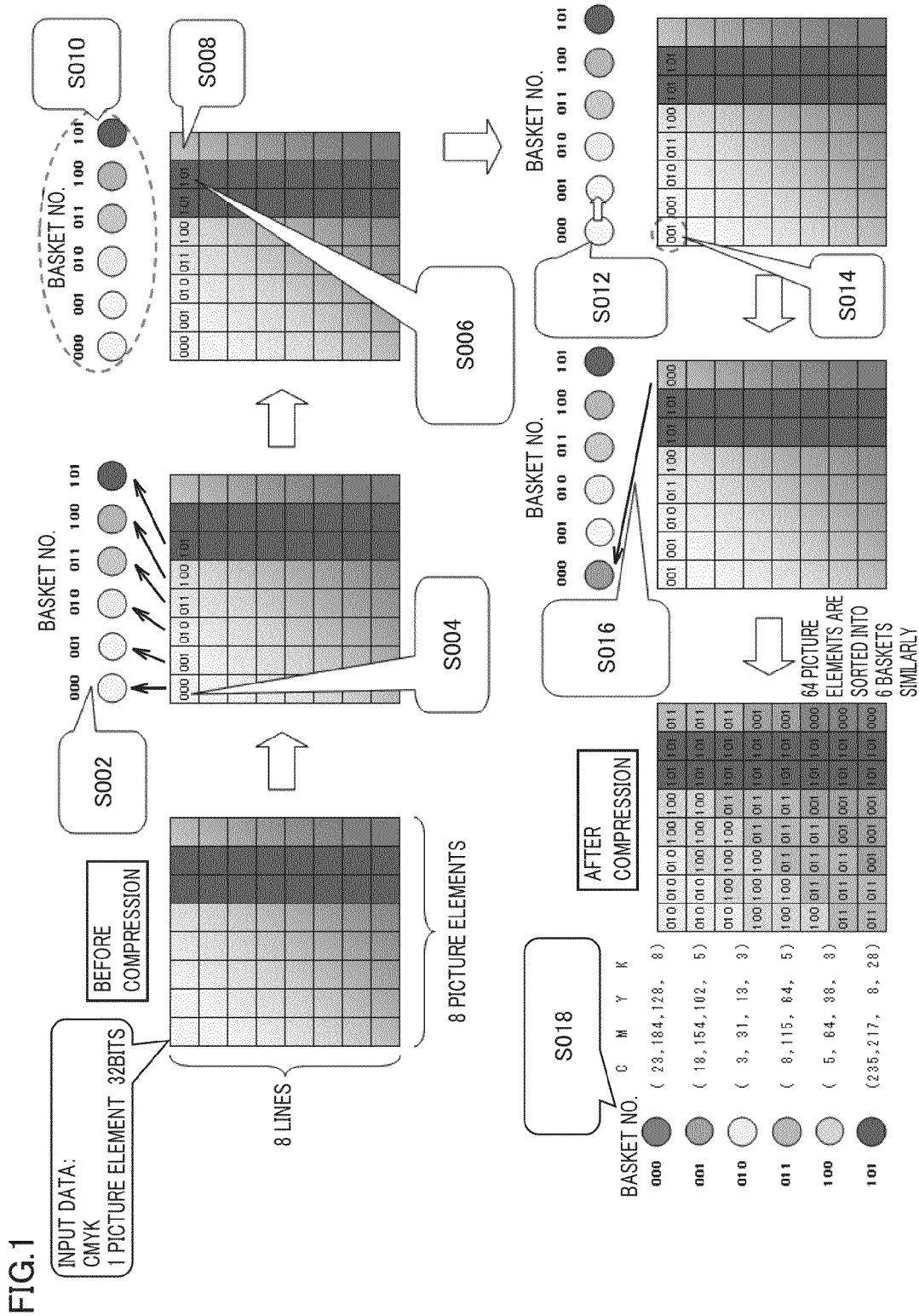
FIG. 1 is a conceptual view showing an operation concept of an image processing apparatus according to an embodiment.

FIG. 1 is a conceptual view showing an operation concept of image processing apparatus MFP according to the embodiment. Referring to FIG. 1, image processing apparatus MFP compresses image data based on a basket method (box method). Image processing apparatus MFP prepares color-assigned baskets (boxes). In other words, image processing apparatus MFP prepares baskets to which color attribute values are assigned, respectively. Image processing apparatus MFP specifically determines the basket which should accommodate each of a plurality of picture elements forming an image, and thereby sorts the plurality of picture elements into the baskets. The baskets are groups into which picture elements were classified.

FIG. 1 shows an example in which image processing apparatus MFP classifies the plurality of picture elements forming the picture element into six colors. In other words, FIG. 1 shows an example in which image processing apparatus MFP sorts the plurality of picture elements into six kinds of baskets.

More specifically, image processing apparatus MFP sets a representative color and a color space for each basket. Image processing apparatus MFP allocates the plurality of picture elements forming the image into the baskets, and produces one new basket by merging the baskets of similar colors. This processing corresponds to box merge processing. Image processing apparatus MFP classifies the picture elements into colors by repeating the sorting of the picture elements and the production of the baskets.

Particularly, when image processing apparatus MFP according to the embodiment sorts the plurality of picture elements into the baskets, i.e., when it stores information specifically indicating the basket accommodating each picture element, image processing apparatus MFP successively stores information to be referred to for sorting subsequent picture elements as well as information indicating cumulative total of intensities of the picture elements sorted into the baskets. This can reduce the number of times which the image data is accessed in the process of compressing the image data.

In other words, the processing of sorting the plurality of picture elements can be completed in the same order as the obtaining the plurality of picture elements that form the image data. Therefore, it is not necessary to hold all the image data of one block or one band. Thus, the image data can be compressed by holding only the values (reference values and statistical values) related to the picture element data sorted into the baskets.

Description will now be given on a structure for implementing the above functions. For the illustration, image data according to the embodiment consists of 64 (8×8) blocks. Each block according to the embodiment consists of 64 (8×8) picture elements. Image processing apparatus MFP according to the embodiment sorts the 64 picture elements forming the block into six baskets.

<Hardware Structure of Image Processing Apparatus MFP>

Figure 2:
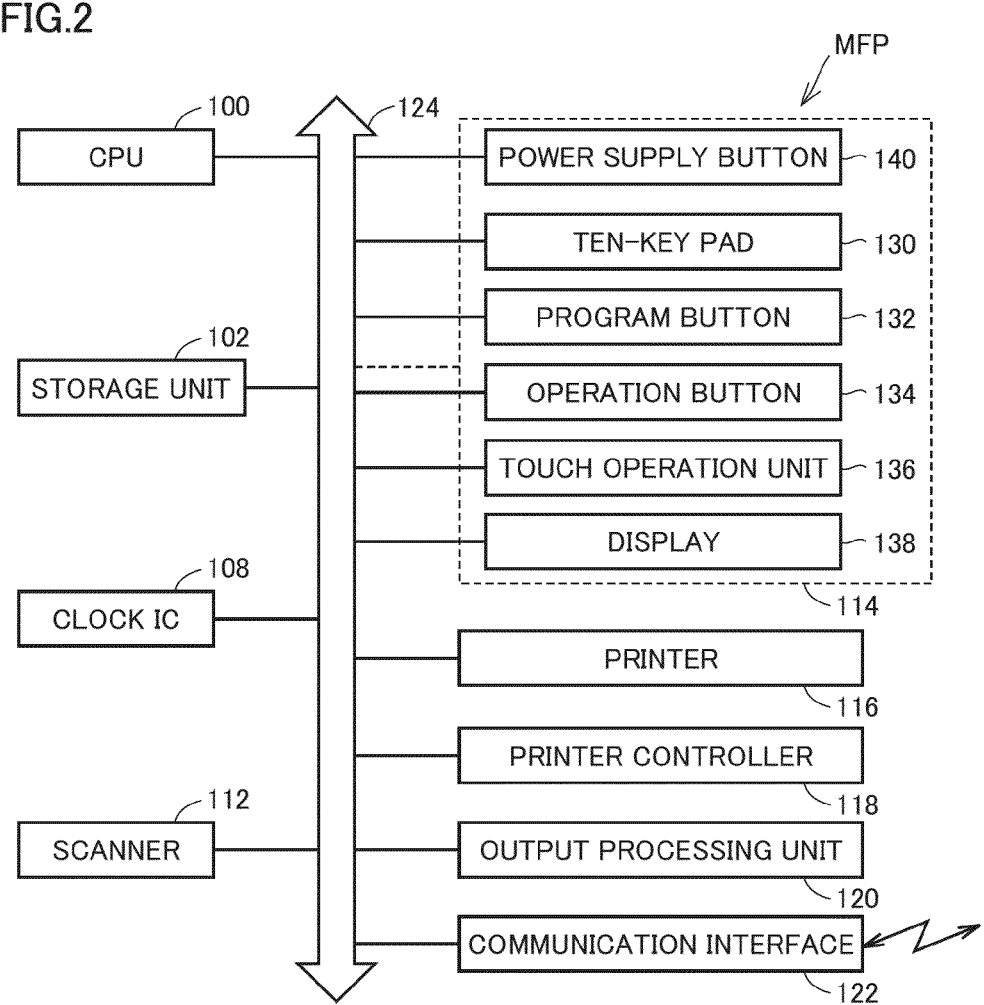
FIG. 2 is a schematic view showing a hardware structure of the image processing apparatus according to the embodiment.

FIG. 2 is a schematic view showing a hardware structure of image processing apparatus MFP according to the embodiment.

Referring to FIG. 2, image processing apparatus MFP includes a CPU (Central Processing Unit) 100, a memory 102 and a clock IC (Integrated Circuit) 108. These portions are connected together via a bus 124. These portions are connected together via bus 124. Memory 102 is formed of a ROM (Read Only Memory), an S-RAM (Static-Random Access Memory), an NV-RAM (Non-Volatile Random Access Memory), an HDD (Hard Disc Drive) or the like.

CPU 100 reads a program prestored in the ROM, HDD or the like forming a nonvolatile memory in memory 102 into the S-RAM forming a work memory in memory 102, and executes it to implement the image processing according to the embodiment. Memory 102 formed of the HDD or the like can nonvolatilely store data of a relatively large volume, and can store multiple kinds of data such as image data received from a server device SRV by a communication interface 122 (which will be described later) and image data obtained by a scanner 112 (which will be described later) reading an image. Clock IC 108 includes a crystal oscillator or the like, and measures a current time.

Image processing apparatus MFP includes scanner 112, an operation panel 114, a printer 116, a printer controller 118 and an output processing unit 120.

Scanner 112 is a portion for implementing a scanner function, and reads an original document to produce image data. In summary, scanner 112 includes a carrying table for setting the original document, a document table glass, a transporting unit for automatically transporting the documents set on the carrying table onto the document table glass one by one, and a discharge table onto which the documents are discharged after the scanning, although all of these portions are not shown.

Based on the image data, printer 116 prints images on paper mediums or the like based on the image data. Printer 116 includes an image forming unit formed of an exposing unit, a developing roller and others, a transfer roller transferring a toner image formed by the image forming unit onto the paper medium, a fixing unit fixing the transferred toner image, a control circuit controlling operations of various portions and units, and the others.

Printer controller 118 converts image data provided from server device SRV or a personal computer, image data in the BOX or the image data provided from scanner 112 into print data suitable for the print processing performed by printer 116. When image processing apparatus MFP is of a color type, printer controller 118 converts the image data into four raster data items of four colors of yellow (Y), magenta (M), cyan (C) and black (K), and provides the raster data items of the respective colors to printer 116.

Output processing unit 120 is a portion for performing the processing on the paper medium after the image processing by printer 116, and typically executes "sort processing", "group processing", "staple processing", "punch processing" and the like. The "sort processing" means so-called printing per copy. The "group processing" is processing of collectively outputting a set number of paper mediums of each page. The "stable processing" is processing of stapling the output paper mediums. The "punch processing" is processing of punching the output paper mediums for binding the pages.

Image processing apparatus MFP includes communication interface 122. Communication interface 122 is a portion for transmitting and receiving the image data between a personal computer PC and server device SRV over a network NW which will be described later.

<Functional Structure of Image Processing Apparatus MFP>

Figure 3:
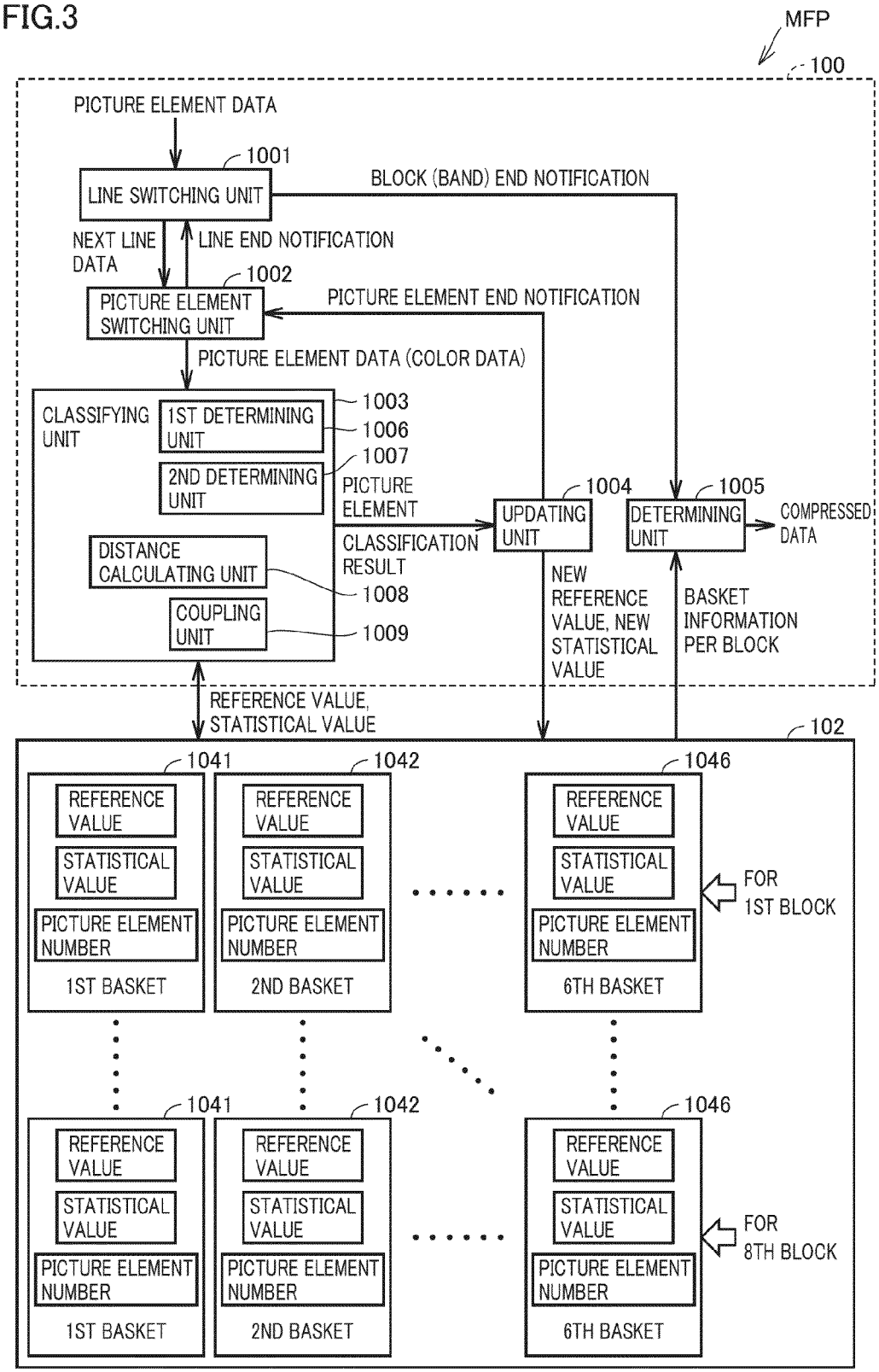
FIG. 3 is a block diagram showing a functional structure of the image processing apparatus according to the embodiment.

A functional structure of image processing apparatus MFP will now be described. FIG. 3 is a block diagram showing the functional structure of image processing apparatus MFP according to the embodiment. Referring to FIG. 3, image processing apparatus MFP includes a line switching unit 1001, a picture element switching unit 1002, a classifying unit 1003, an updating unit 1004, a determining unit 1005 and a memory 1002. Classifying unit 1003 includes first and second determining unit 1006 and 1007 as well as a distance calculating unit 1008 and a coupling unit 1009.

Line switching unit 1001, picture element switching unit 1002, classifying unit 1003, updating unit 1004, determining unit 1005, first and second determining unit 1006 and 1007, distance calculating unit 1008 and coupling unit 1009 are implemented by CPU 100 reading the program prestored in the ROM, HDD or the like into the S-RAM and executing it. Thus, CPU 100 of image processing apparatus MFP has the functions as line switching unit 1001, picture element switching unit 1002, classifying unit 1003, updating unit 1004, determining unit 1005, first and second determining unit 1006 and 1007, distance calculating unit 1008 and coupling unit 1009.

Each of the function blocks of image processing apparatus MFP will be described below in detail. As described before, the S-RAM or HDD implements memory 102. Memory 102 stores, for each group of the plurality of blocks forming the image data, first to sixth basket information items 1041, 0142, 1043, 1044, 1045 and 1046.

Image processing apparatus MFP according to the embodiment handles, as one band, eight blocks laterally aligned in each row included in the plurality of blocks (8×8 blocks) forming the image data. Thus, memory 102 stores first to sixth basket information items 1041-1046 for eight blocks. Each of first to sixth basket information items 1041-1046 includes a reference value for sorting the picture elements into the baskets, a statistical value for calculating a representative value of the baskets and identification information for identifying the picture elements sorted into the baskets.

In this embodiment, the reference value of each basket includes diagonal points specifying a corresponding color space (rectangular parallelepiped), i.e., the maximum and minimum values of the intensity or luminance of the picture elements sorted into the basket. Alternatively, the reference value of each basket includes a center point or a centroid of the corresponding color space (rectangular parallelepiped). The statistical value of each basket includes a cumulative total of the intensity or luminance of the picture elements sorted into the corresponding basket. In the following description, the data representing the intensity or luminance of the plurality of colors in each picture element is collectively referred to as color data or picture element data.

For sorting the picture elements forming the block into first to sixth baskets, CPU 100 reads corresponding first to sixth basket information items 1041-1046 from memory 102. Based on first to sixth basket information items 1041-1046 and the target picture element data (i.e., picture element data to be processed), CPU 100 sorts the target picture element into one of the first to sixth baskets.

Line switching unit 1001 receives the image data and provides line data, i.e., image data for one line to picture element switching unit 1002. When line switching unit 1001 receives a line end notification from picture element switching unit 1002, it provides next line data to picture element switching unit 1002. When line switching unit 1001 provides all the picture element data of the block (band) to classifying unit 1003, it sends a block (band) end notification to determining unit 1005.

When picture element switching unit 1002 receives the line data from line switching unit 1001, it provides the picture element data to classifying unit 1003. Every time picture element switching unit 1002 receives the picture element end notification from updating unit 1004, it provides the next picture element data to classifying unit 1003. After picture element switching unit 1002 provides all the picture element data to classifying unit 1003, it sends the line end notification to line switching unit 1001.

First determining unit 1006 of classifying unit 1003 determines whether the reference values in first to sixth basket information items 1041-1046 contain the intensity of the picture element contained in the target picture element data or not. Alternatively, first determining unit 1006 determines whether the intensity of the picture element contained in the picture element data match the reference values in first to sixth basket information items 1041-1046 or not.

When the reference values in first to sixth basket information items 1041-1046 do not contain the intensity of the picture element contained in the target picture element data, second determining unit 1007 of classifying unit 1003 determines whether a basket not bearing a reference value is present or not. Alternatively, when the intensity of the picture element contained in the picture element data does not match the reference values in first to sixth basket information items 1041-1046, second determining unit 1007 determines whether a basket not bearing a reference value is present or not.

When the reference values in first to sixth basket information items 1041-1046 do not contain the intensity of the picture element contained in the target picture element data (or when the intensity of the picture element contained in the picture element data does not match the reference values in first to sixth basket information items 1041-1046), and a basket not bearing a reference value is not present, distance calculating unit 1008 of classifying unit 1003 calculates first distances in the color spaces between the reference values related to all the baskets. Distance calculating unit 1008 calculates second distances in the color spaces between the intensities of the target picture elements and the reference values related to all the baskets.

When the first distance is the shortest of the first and second distances, coupling unit 1009 of classifying unit 1003 couples the two baskets related to the corresponding reference value to produce one new basket.

When the reference values in first to sixth basket information items 1041-1046 contain the intensity of the picture element contained in the target picture element data, classifying unit 1003 sorts the picture element in question into the basket corresponding to the reference value in question. Alternatively, when the intensity of the picture element contained in the target picture element data matches the reference values in first to sixth basket information items 1041-1046, classifying unit 1003 sorts the picture element in question into the basket corresponding to the reference value in question.

When the reference values in first to sixth basket information items 1041-1046 do not contain the intensity of the picture element contained in the target picture element data, and a basket not bearing a reference value is present, classifying unit 1003 sorts the target picture element into the basket in question. Alternatively, when the intensity of the picture element contained in the picture element data does not match the reference values in first to sixth basket information items 1041-1046, and a basket not bearing a reference value is present, classifying unit 1003 sorts the target picture element into the basket in question.

When coupling unit 1009 couples the two baskets to produce the one new basket, i.e., when the six baskets change into the five baskets, classifying unit 1003 produces a new basket that has not yet contained a sorted picture element. Thus, classifying unit 1003 produces the new sixth basket, and sorts the related picture elements into the sixth basket. Conversely, when a second distance is the shortest of the first and second distances, classifying unit 1003 sorts the related picture element into the basket corresponding to the reference value related to it.

When classifying unit 1003 classifies the picture element into the basket, it passes identification information for identifying the picture element in question, the intensity of the picture element and the number indicating the basket receiving the classified picture element to updating unit 1004.

Updating unit 1004 receives the identification information for identifying the picture element in question, the picture element data and the number of the destination basket, i.e., the basket containing the classified picture element from classifying unit 1003, and updates the reference value and the statistical value relating to destination based on the intensity of the picture element. When updating unit 1004 updates the reference value and the statistical value of the destination basket, it sends the picture element end notification to picture element switching unit 1002.

For example, based on the intensity of each color forming the picture element, updating unit 1004 updates the maximum value and the minimum value of the intensity of each color of the basket containing the sorted picture elements. This increases the size of the basket in question in the color space. Updating unit 1004 updates the cumulative total of the intensities of respective colors of the basket containing the sorted picture elements based on the intensity of each color forming the picture element data.

When determining unit 1005 receives the block (band) end notification from line switching unit 1001, it provides a result of the classification to other applications, devices and the like based on first to sixth basket information items 1041-1046.

For example, memory 102 (or an HOD) stores the result of classification provided from CPU 100 functioning as determining unit 1005. Also, CPU 100 causes a display 138 to display the compressed image based on the result of classification. Alternatively, CPU 100 causes printer 116 to print the compressed image based on the result of classification.

In the above processing, the maximum and minimum values of the intensities of the picture elements in each basket are handled as the reference values, and the cumulative total of the intensities of the picture elements in each basket is handled as the statistical value. For example, however, the average of the intensities of the picture elements in each basket may be handled as the reference value, and the maximum and minimum values of the intensities of the picture elements in each basket may be handled as the statistical values. Further, the maximum and minimum values of the intensities of the picture elements in each basket may be handled as the reference values, and the average of the intensities of the picture elements in each basket may be handled as the statistical values.

<Image Compression Processing>

Figure 4:
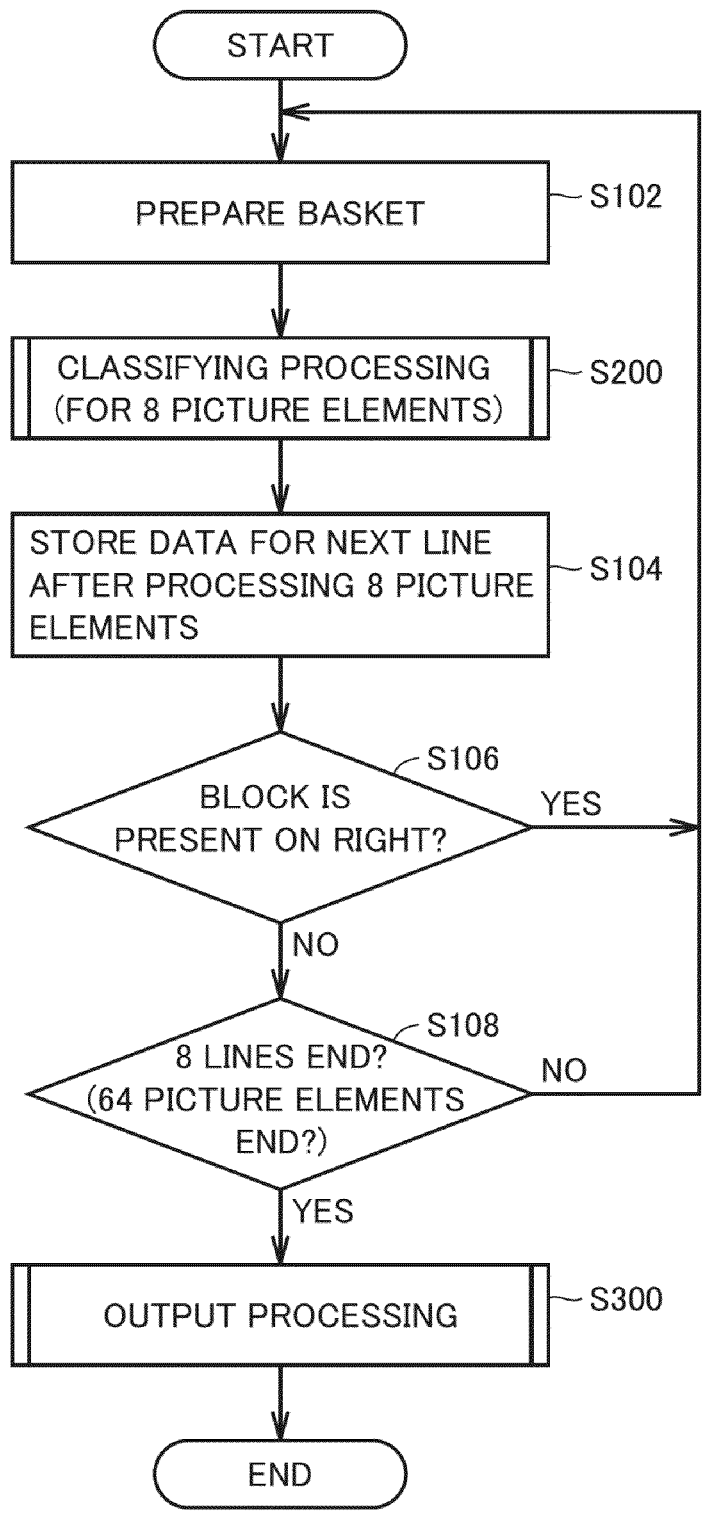
FIG. 4 is a flowchart showing a processing procedure of image compression processing in the image processing apparatus according to the embodiment.

Referring primarily to FIGS. 1 to 4, description will be given on the processing procedure of the image compression processing. FIG. 4 is a flowchart showing a processing procedure of the image compression processing in image processing apparatus MFP according to the embodiment.

First, CPU 100 functioning as line switching unit 1001 prepares the baskets for sorting the picture elements in the target block thereinto (step S102). More specifically, CPU 100 reads first to sixth basket information items 1041-1046 (temporary information) for the target block from a temporarily saving area of memory 102, and stores them in a work area of memory 102. The temporarily saving area and the work area of memory 102 may be implemented by different storage devices, respectively, or may be implemented by different areas in the same storage device, respectively.

CPU 100 functioning as classifying unit 1003 executes the sort processing on the picture elements (8 picture elements) in the target line of the target block (step S200). The sort processing in step S200 will be described later.

When CPU 100 completes the sort processing for the eight picture elements in the target line of the target block, it reads the data (first to sixth basket information items 1041-1046 for the target block) to be passed to the next line from the work area of memory 102, and saves the read data in the temporarily saving area of memory 102 (step S104).

More specifically, the processing in step S104 is performed to save temporarily the data for processing the next block. After the eight picture elements are sorted, memory 102 saves, as the data to be passed to the processing for the next line, "the maximum and minimum values of the intensities of CMYK", "the cumulative total of the intensities of CMYK", "the number of the sorted picture elements in each basket", the numbers (indexes) of the baskets into which the respective picture elements are sorted, until the sort processing for the next line starts.

For reducing the used area of memory 102, i.e., for reducing the cost, it is desired to reduce the amount of data to be saved. In step S104, CPU 100 performs the processing in connection with the number (index) of the basket containing each sorted picture element, and specifically it converts "a flag specifically indicating the picture elements" contained in each basket (384 bits=64 bits (on/off of 64 picture elements)×6 baskets) into "data specifically indicating the baskets" containing the respective picture elements (192 bits=64 picture elements×3 bits (basket identification number), and saves it. After the sort processing (step S200) for the eight picture elements, CPU 100 starts the sort processing for the next block.

Thus, in this processing, the information required for sorting the picture elements into n kinds of baskets is "the maximum and minimum values of the intensities of CMYK". The statistical information is "the cumulative total of the intensities of CMYK" in each basket and "the number of the sorted picture elements in each basket".

As described above, memory 102 must temporarily save the data to be passed to the next line as described above. Therefore, it is preferable that the amount of data is small. Accordingly, the following structure may be employed for step S104. This further reduces the amount of data to be saved in memory 102.

Thus, after the end of the sort processing of the eight picture elements, memory 102 saves, as the data to be passed to the next line processing, "the cumulative total of the intensities of CMYK" in each basket, "the number of the sorted picture elements in each basket" and the number (index) of the basket containing each sorted picture element in step S104, until the sort processing for the next line starts.

In other words, CPU 100 performs the processing in connection with the number (index) of the basket containing each sorted picture element in step S104, and specifically converts "the flag specifically indicating the picture elements" contained in each basket (384 bits=(64 bits (on/off of 64 picture elements)×6 baskets) into "the data specifically indicating the baskets" containing the respective picture elements" (192 bits=64 picture elements×3 bits (basket identification number), and saves it.

After the end of the sort processing for the eight picture elements (step S200), CPU 100 starts the sort processing for the next block.

According to the processing that has been described, "the maximum and minimum values of the intensities of CMYK" that are determination data for classifying the picture elements into the colors will not be present when the sort processing for the next line is performed. Therefore, when the baskets are prepared in step S102, the average is calculated from the cumulative total of the intensities of the CMYK and the number of the picture elements, and the same value (average) is substituted for the maximum and minimum values. According to this configuration, image processing apparatus MFP can correctly perform the classification of the picture element into colors, and substantially causes no change in image quality. Since the cumulative total is also saved, the average that is the representative value is correctly calculated.

Memory 102 may save, as the statistical value of the temporary information, the average of the intensities per basket instead of the cumulative total of the intensities per basket, and CPU 100 may output this average as the representative value. Conversely, memory 102 may save, as the statistical value of the temporary information, "the maximum and minimum values of the intensities of CMYK", and CPU 100 may calculate the cumulative total or the average.

For reducing the amount of calculation by CPU 100, image processing apparatus MFP according to the embodiment stores the number of the picture elements as the temporary information. However, the number of the picture elements may be calculated from the index.

CPU 100 determines whether another block is present on the right of the block processed in steps S102, S200 and S104, or not (step S106). When a block is present on the right of the block processed in steps S102, S200 and S104 (YES in step S106), the processing starting from step S102 repeats.

When no block is present on the right of the block processed in steps S102, S200 and S104 (NO in step S106), CPU 100 determines whether the sorting of the picture elements for eight lines (64 picture elements) is completed or not (step S108). When the sorting of the picture elements for eight lines (64 picture elements) is not completed (NO in step S108), the processing starting from step S102 repeats. Thus, CPU 100 prepares the basket for the block on the left end of the image data (step S102). Then, CPU 110 sorts the picture elements in the next line into the baskets.

When the sorting of the picture elements in eight lines (64 picture elements) is completed (YES in step S108), CPU 100 executes the output processing (step S300), which will be described later.

<Picture Element Sort Processing>

Figure 5:
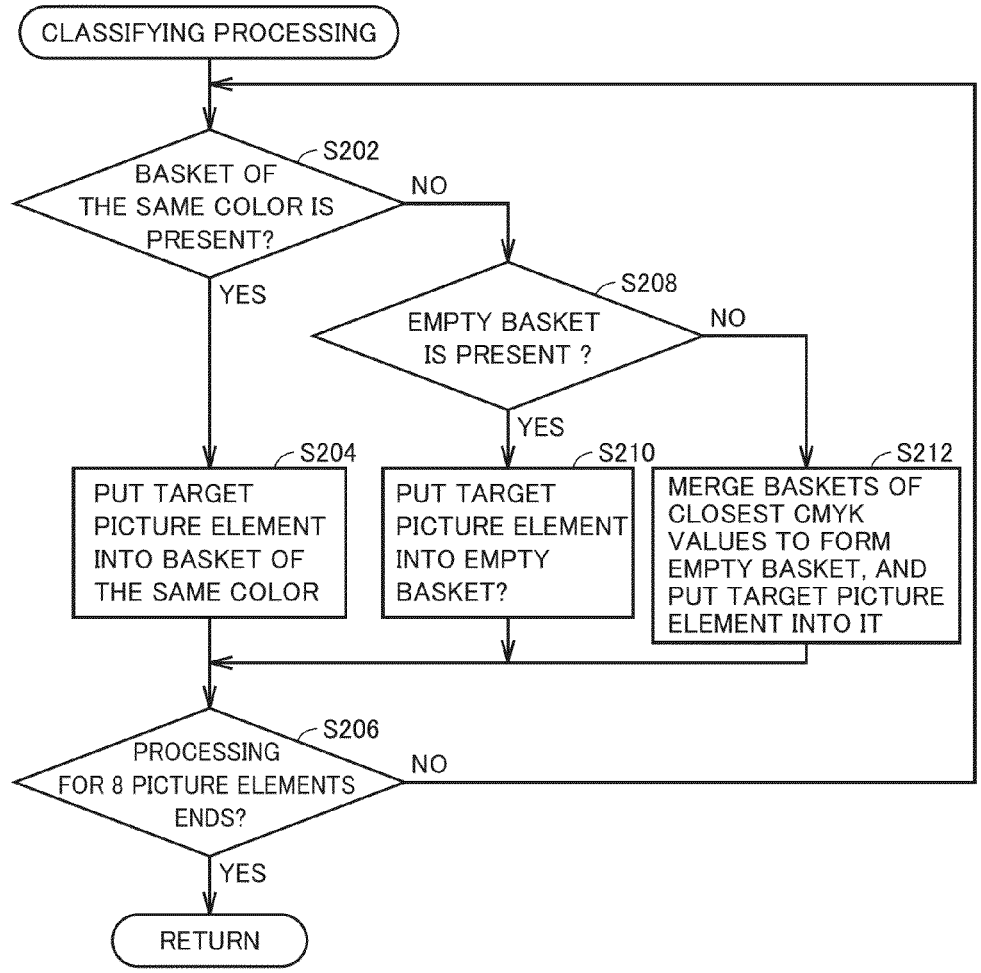
FIG. 5 is a flowchart showing a processing procedure of image sort processing in the image processing apparatus according to the embodiment.

Referring primarily to FIGS. 1 to 3 and 5, description will be given on the procedure of the image sort processing. FIG. 5 is a flowchart showing the processing procedure of the image sort processing in image processing apparatus MFP according to the embodiment.

First, CPU 100 functioning as classifying unit 1003 determines whether the reference values in the first to sixth basket information items 1041-1046 contain the intensity of the picture element contained in the target picture element data or not (step S202). Alternatively, CPU 100 determines whether the intensity of the picture element contained in the target picture element data matches the reference value in the first to sixth basket information items 1041-1046 or not.

When the reference values in the first to sixth basket information items 1041-1046 do not contain the intensity of the picture element contained in the target picture element data (YES in step S202), CPU 100 sorts the picture element in question into the basket corresponding to the reference value in question (step S204). Alternatively, when the intensity of the picture element contained in the target picture element data matches the reference value in the first to sixth basket information items 1041-1046, CPU 100 sorts the picture element in question into the basket corresponding to the reference value in question. CPU 100 executes the processing starting from a step S206.

In connection with the basket containing the target picture element, "the flag specifically indicating the contained picture elements", "the cumulative total of the intensities of CMYK" and "the number of the picture elements contained in the basket" are updated.

When the reference values in first to sixth basket information items 1041-1046 do not contain the intensity of the picture element contained in the target picture element data (NO in step S202), CPU 100 determines whether a basket not yet bearing the reference value is present or not (step S208). Alternatively, when the intensity of the picture element contained in the target picture element data does not match the reference values in the first to sixth basket information items 1041-1046, CPU 100 determines whether the basket not yet bearing the reference value is present or not (step S208).

When the basket not bearing a reference value is present (YES in step S208), the target picture element is sorted into this basket (step S210). CPU 100 sorts the picture elements into the baskets according to an ascending order of the numbers of the baskets.

In connection with the basket containing the target picture element, "the flag specifically indicating the contained picture elements", "the cumulative total of the intensities of CMYK" and "the number of the picture elements contained in the basket" are updated. The intensities of CMYK of the target picture elements are substituted for the maximum and minimum values of each color plane as they are. CPU 100 executes the processing starting from step S206.

When the basket not yet bearing the reference value is not present (NO in step S208), CPU 100 calculates the first distances in the color spaces between the reference values related to all the baskets. At this point in time, distance calculating unit 1008 calculates second distances in the color spaces between the intensities of the target picture elements and the reference values related to all the baskets.

When the first distance is the shortest of the first and second distances, CPU 100 couples the two baskets related to the corresponding reference value to produce one new basket (step S212). CPU 100 produces a basket that has not contained a sorted picture element, and sorts the picture element in question into this basket. Conversely, when the second distance is the shortest of the first and second distances, CPU 100 sorts the related picture element into the basket corresponding to the reference value related to it. CPU 100 executes the processing starting from step S206.

In other words, CPU 100 merges the basket of a small basket number with the basket of a large basket number, keeping the smallest color difference in the combination. In connection with the baskets thus merged, CPU 100 performs OR processing on "the flag specifically indicating the contained picture elements" to be described later, totalizes "the cumulative totals of the intensities of CMYK" and totalizes "the numbers of the picture elements contained in the baskets". Further, CPU 100 makes a comparison between the maximum and minimum values of the intensities of CMYK of the baskets to be merged, and thereby updates the maximum and minimum values for the basket after the merging.

When the target picture element is close to one of the representative values of the baskets, CPU 100 adds the data of the target picture element to the basket in question, and updates "the flag specifically indicating the contained picture elements", "the cumulative total of the intensities of CMYK" and "the maximum and minimum values of the intensity of CMYK".

In step S206, CPU 100 determines whether the sorting of the eight picture elements into the baskets is completed or not (step S206). When the sorting of the eight picture elements into the baskets is completed (YES in step S206), CPU 100 ends the sort processing. When the sorting of the eight picture elements into the baskets is not completed (NO in step S206), CPU 100 repeats the processing starting from step S202.

<Output Processing>

Figure 6:
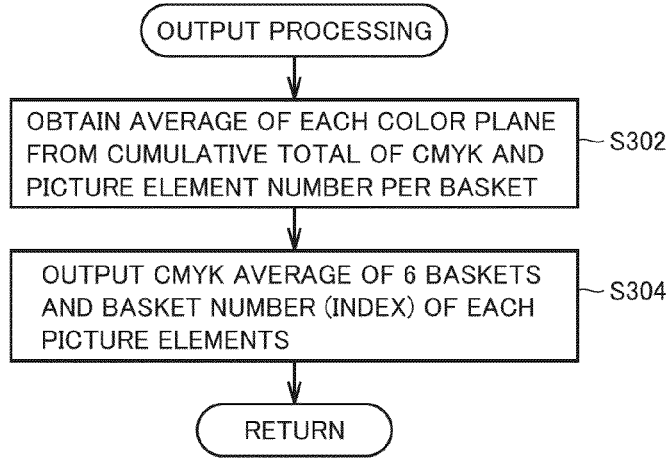
FIG. 6 is a flowchart showing a processing procedure of output processing in an image processing apparatus MFP according to the embodiment.

Referring primarily to FIGS. 1 to 3 and 6, a processing procedure of the output processing will be described. FIG. 6 is a flowchart showing the processing procedure of the output processing in image processing apparatus MFP according to the embodiment.

CPU 100 functioning as determining unit 1005 in this processing outputs the average (representative value) of CMYK of each basket and the number (index) of the basket containing each sorted picture element. In this embodiment, CPU 100 outputs the data for 8 lines (after the end of 64 picture elements) according to the following procedure.

First, CPU 100 obtains the average of the intensities of each of CMYK from the cumulative total of the intensities and the number of the picture elements (step S302). CPU 100 outputs the CMYK average of each basket and the basket number (index) of each picture element (step S304).

Memory 102 or HDD 110 may store a result of the classification by CPU 100 functioning as determining unit 1005. CPU 100 may display the compressed image on display 138 based on the result of classification. Alternatively, CPU 100 may cause printer 116 to print the compressed image based on the result of classification.

<Flow of Image Data>

Figure 7:
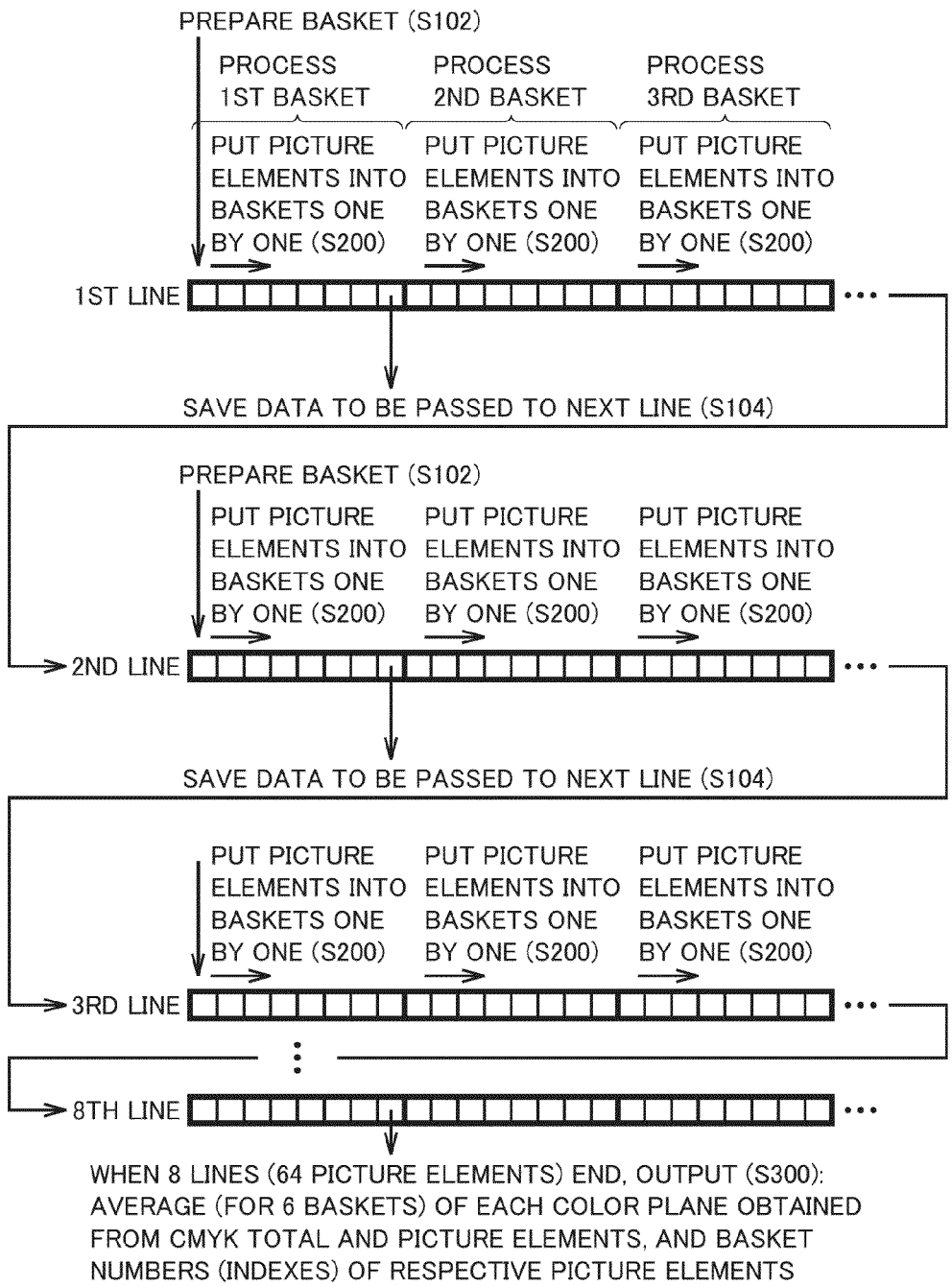
FIG. 7 is a conceptual view showing a flow of image data in image compression processing according to the embodiment.

Description will be given on the flow of the image data in the above image compression processing. FIG. 7 is a conceptual view showing the flow of the image data in the image compression processing according to the embodiment.

Referring to FIG. 7, for preparing the baskets (step S102), CPU 100 copies, to a work area, first to sixth basket information items 1041-1046 of subjects or targets that were saved in the temporarily saving area when the sorting of the picture elements of the last line ended.

The data saved in the temporarily saving area is as follows. Memory 102 according to the embodiment saves the following data per blocks contained in one band (i.e., blocks through which the target line extends). In the following description, it is assumed that the image is formed of cyan (C), magenta (M), yellow (Y) and black (K). 8 bits represents the intensity of each color plane.

Maximum and Minimum Values of Color Plane:

(8 bits (maximum value of intensity)+8 bits (minimum value of intensity))×4 colors×6 baskets=384 bits Cumulative Total of Baskets:

14 bits×4 colors×6 baskets=336 bits

Number of Picture Elements Sorted into Baskets:

6 bits (number of picture elements)×6 baskets=36 bits

Basket Number of Picture Element (Classification Result):

3 bits×64 picture elements=192 bits

The total of these data items of one block is 948 bits.

In the sort processing (step S200), the work area stores the following data. Memory 102 according to the embodiment stores the following data per basket only for the target blocks.

Flag (for 64 Picture Elements) Specifically Indicating the Picture Elements Contained therein:

64 bits

Cumulative Total of Intensities of Picture Elements:

14 bits×4 colors=56 bits

Maximum and Minimum Values of Each Color Plane:

16 bits×4 colors=64 bits

The total of these data items for 6 baskets is equal to 1140 bits (=190 bits×6 baskets).

When the processing of sorting the picture element of one line of the target block ends, CPU 100 stores the data related to the target block in the temporarily saving area, based on the data that relates to each basket and is stored in the work area at the time of ending of the above sort processing. The data saved in the temporarily saving area is substantially the same as those already described so that description thereof is not repeated.

When CPU 100 ends the sort processing of the picture elements of one line of the target block, CPU 100 performs the processing of sorting the picture elements of the line in question in the next block. CPU 100 repeats the preparing (step S102) of the baskets and the sort processing (step S200).

When CPU 100 ends the processing of sorting all the picture elements in the target line (first line), it then performs the processing of sorting the picture elements in the next line (second line). As described before, CPU 100 prepares the baskets per block (step S102), and performs the processing of sorting the picture elements included in the second line (step S200).

When CPU 100 ends the processing of sorting the picture elements in all the lines (1 band), i.e., when it ends the sorting of the picture elements in 8 lines, CPU 100 calculates the average (representative value) of the intensities of CMYK from the cumulative total of the intensities of CMYK and the number of the picture elements. CPU 100 outputs the representative value of each basket and the basket number of each picture element.

Figure 8:
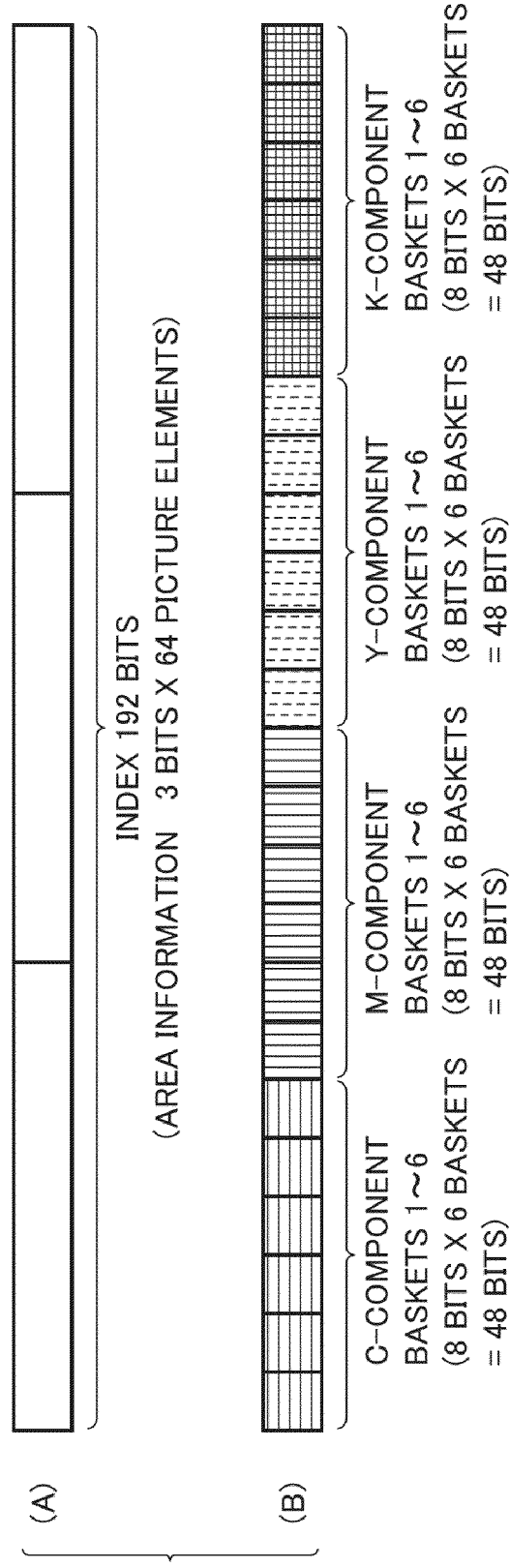
FIG. 8 is a conceptual view showing an output format of CMYK according to the embodiment.
Figure 9:
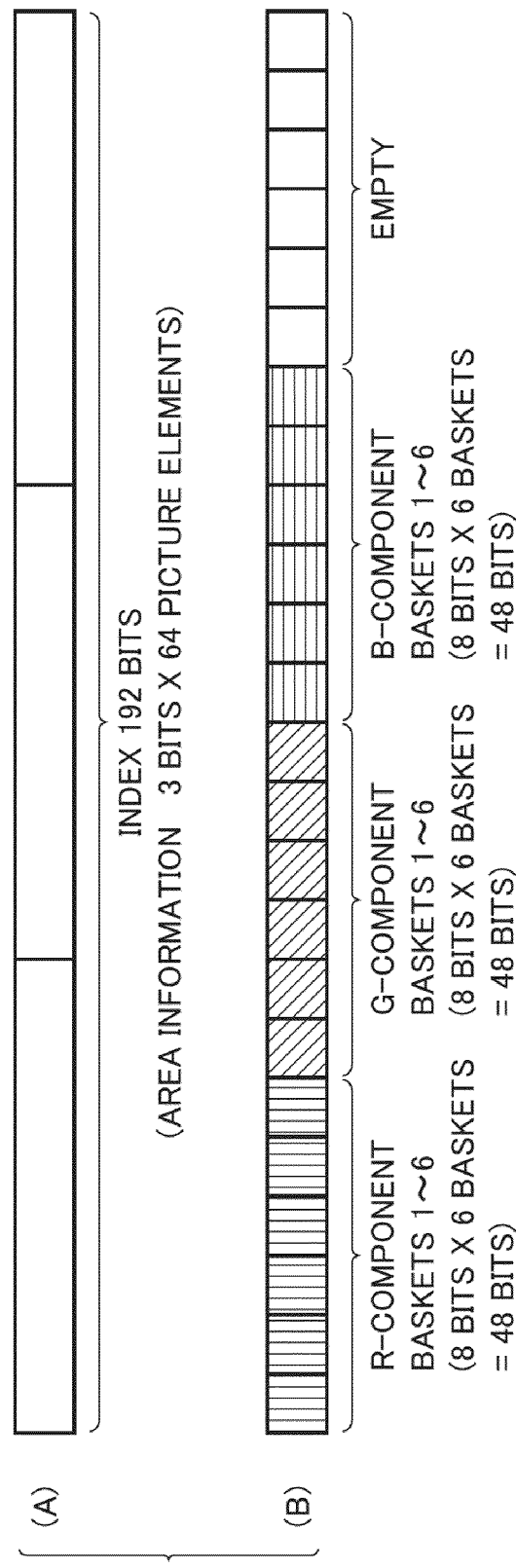
FIG. 9 is a conceptual view showing an output format of RGB according to the embodiment.

Description will now be given on the data provided from CPU 100 to other applications, devices or the like. FIG. 8 is a conceptual view showing an output format of CMYK according to the embodiment. FIG. 9 is a conceptual view showing an output format of RGB according to the embodiment.

Referring to FIG. 8, the compressed data of CMYK of which picture elements are sorted into the baskets includes an index portion and representative values of C-, M-, Y- and K-components. The index portion specifically indicates the basket to which each picture element belongs. The data quantity is 192 bits (=3 bits×64 picture elements). Each of the representative values of the C-, M-, Y- and K-components includes a representative value (8 bits) per basket. The data quantity of each of the representative values of the C-, M-, Y- and K-components is 48 bits (=8 bits×6 baskets).

Referring to FIG. 9, the compression data of RGB of which picture elements are sorted into the baskets includes an index portion and representative values of R (Red), G (Green) and B (Blue) components. The index portion specifically indicates the basket to which each picture element belongs. The data quantity is 192 bits (=3 bits×64 picture elements). Each of the representative values of the R-, G- and B-components includes a representative value (8 bits) per basket. The data quantity of each of the representative values of the R-, G- and B-components is 48 bits (=8 bits×6 baskets).

<Comparison with Other Image Compression Methods>

Description will be given on a difference between the image processing method (image compression method) according to the embodiment and other image compression methods.

(Summary of BTC Algorithm)

Figure 10:
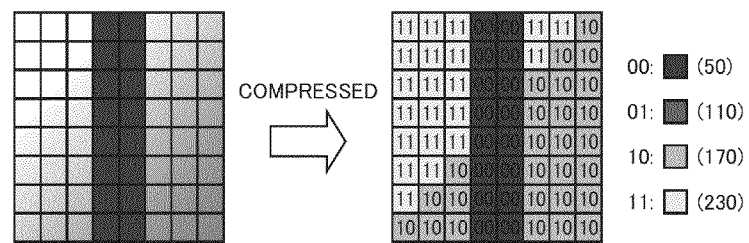
FIG. 10 is a first conceptual view showing a BTC algorithm.
Figure 11:
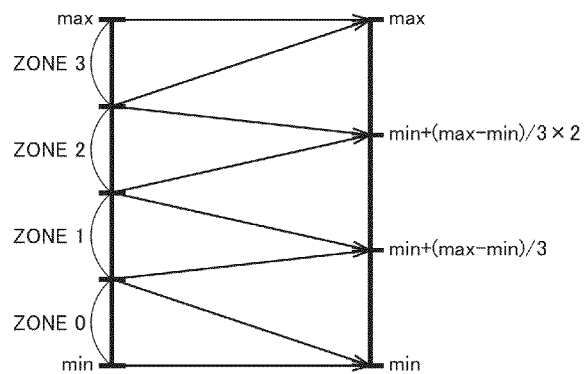
FIG. 11 is a second conceptual view showing the BTC algorithm.

First, description will be given on an image compression method using a BTC algorithm. FIG. 10 is a first conceptual view showing the BTC algorithm. FIG. 11 is a second conceptual view showing the BTC algorithm.

Referring to FIG. 10, the image processing apparatus reduces colors to four colors (represented by 2 bits) per plane in connection with the picture elements in the block. Further, the image processing apparatus reduces the data quantity by recording only two of the four colors in question. For example, the image processing apparatus does not record the representative colors relating to "01" and "10", and the like.

The original picture element has data of 8 bits per picture element. Thus, the original image has the data of 512 bits (=8 bits×64 picture elements) as a whole. The image processing apparatus reduces the data quantity of the whole image to 144 bits (=2 bits×64 picture elements+8 bits×2colors) by reducing the colors of the image. Thus, the original image can be compressed into 28% of the original. When the number of the picture elements of the block is (4×4), the original image can be compressed into 34% of the original.

Referring to FIG. 11, according to the BTC algorithm, the image processing apparatus divides, e.g., a section between the maximum and minimum values of the intensities of the picture elements in the block into a plurality of regions, and performs the color classification of the picture elements based on the specific regions to which the respective picture elements belong. After determining the maximum and minimum values in the block, the image processing apparatus is required to determine each picture element for color classification so that the apparatus must access each picture element of the image data at least two times. Thus, for implementing the above techniques in the hardware, the image processing apparatus must have a structure that can temporarily hold the data of all the picture elements in the block.

(Summary of ABTC Algorithm)

Figure 12:
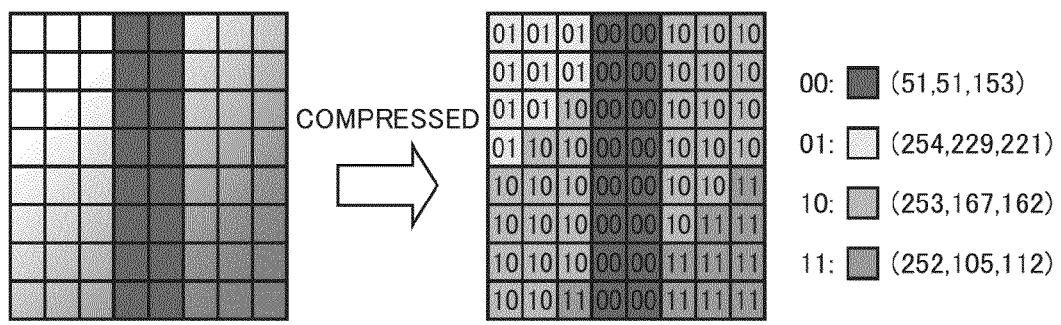
FIG. 12 is a conceptual view showing an ABTC algorithm.

The image compression method using an ABTC algorithm will be described below. FIG. 12 is a conceptual view showing the ABTC algorithm.

Referring to FIG. 12, the image processing apparatus reduces the colors to 4 colors (represented by 2 bits) per plane in connection with the picture elements in the block.

The original image has the data of 24 bits (=8 bits×3 original colors) per picture element. Thus, the original image has the data of 1536 bits (=24 bits×64 picture elements) as a whole. The image processing apparatus reduces the data quantity of the whole image to 224 bits (=2 bits×64 picture elements+24 bits×4 colors) by reducing the image to four colors. Thus, the apparatus can compress the original image to 15% of the original.

(Summary of Another Algorithm 1)

Figure 13:
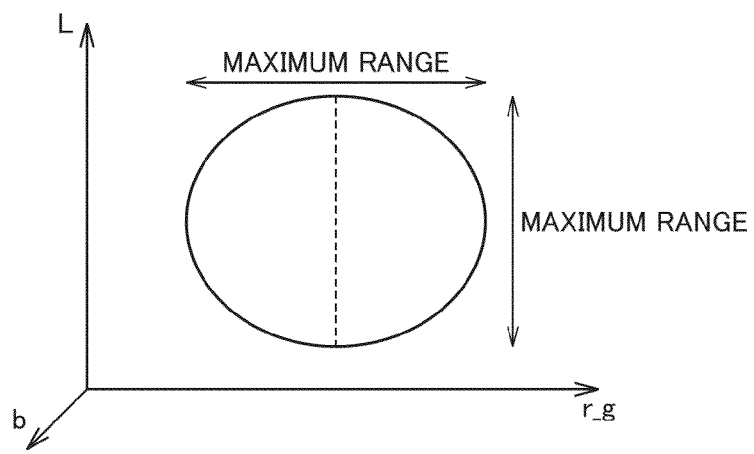
FIG. 13 is a conceptual view showing another algorithm.

Then, description will be given on the image compression method using a first algorithm other than the above. FIG. 13 is a conceptual view showing the first algorithm.

Referring to FIG. 13, the image processing apparatus uses simply equalized color spaces L, r g and b. The image processing apparatus repeats the division in the direction of the maximum range, and searches for a break in color for region division. The image processing apparatus performs the color classification by performing the region division in view of the distribution, in the color space, of the picture element values in the block. According to this algorithm, image processing apparatus MFP must access the image data three times for performing the color classification by evaluating the distribution of the picture element values and for obtaining the representative value (average of the picture element values) after the color classification. Thus, the image processing apparatus must temporarily hold the whole data in the block.

(Summary of Another Algorithm 2)

Then, description will be given on the image compression method using another, i.e., second algorithm. For example, as disclosed in Japanese Laid-open Patent Publication No. 10-40364, an image processing apparatus prepares boxes in a color space, and puts respective colors appearing in a color image into the boxes. The image processing apparatus prepares new boxes for colors other than the initial representative colors, and merges the boxes so that the boxes may always be N in number and may always exhibit a minimum volume. The image processing apparatus prepares an approximate image, handling centroids of the N boxes that are finally prepared, and provides this approximate image to an image output device.

More specifically, the image processing apparatus forms a box of 1 in length from initial colors of N in number that are obtained from the original image and do not overlap together. The image processing apparatus forms the boxes of N in number from the color spaces representing the original image by Mergebox method. The image processing apparatus obtains the representative points of the boxes thus prepared, and prepares a required image by mapping the respective points of the image to these representative points.

First, the image processing apparatus merges the color spaces based on the Mergebox method. First, the boxes of 1 in length and N in number are prepared. The image processing apparatus scans the input image, and determines whether the colors (considered as the boxes of 1 in length) existing therein are the same as the prepared boxes of N in number, or not. When the box does not enter any box, a new one box of 1 in length is prepared, and the point (color) in question is assigned to it. For changing the number (N+1) of the boxes into N, the produced box is merged with a target box, which is selected to exhibit the minimum volume after the merging. The selection is performed by calculating volumes of all the possible combinations of the boxes, and the boxes that will exhibit the minimum volume are merged. The merging is performed to form a new box by using the corners of the two boxes that are spaced from each other by the longest distance. This processing is conducted on all the picture elements of the input image to form the boxes of N in number.

Then, the image processing apparatus prepares an approximate image. As described above, the boxes of N in number merged by the Mergebox method divide the colors representing the input image according to the similar colors. On of the colors in the box must be the representative color. In view of the processing speed, the centroid of the box is employed in this description. The centroid is determined by projecting the points existing in the box onto the respective, i.e., R, G and B axes, and obtaining the averages of the coordinates on the respective axes. The image processing apparatus obtains the centroid of the box in the above manner, and handles it as the representative color.

Even in the above method, however, the image processing apparatus totalizes the picture element values falling within the ranges divided as described above, so that the apparatus accesses the image data two times.

(Advantage of Image Processing Apparatus MFP According to the Embodiment)

Conversely, image processing apparatus MFP according to the embodiment prepares the baskets classified according to the colors, and performs the color classification by successively determining the specific baskets into which the respective picture elements enter. Image processing apparatus MFP repeats the sorting of the picture elements and merging of the baskets of similar colors, and thereby compresses the image. Simultaneously with the color classifying processing, image processing apparatus MFP according to the embodiment records the information specifically indicating the basket accommodating the picture element in question as well as the information required for obtaining the representative value, Thereby, the image processing apparatus can complete the processing of and before the calculation of the representative values of the respective baskets after the color classification, while sorting the picture elements according to the normal order of obtaining the image data.

Accordingly, image processing apparatus MFP according to the embodiment is not required to hold the image data for the blocks. Image processing apparatus MFP is merely required to hold only the data in the baskets as intermediate data. It is not necessary to hold the image data in a band-like region containing blocks and to grab and hold the data in the block portion, so that both the high speed and low cost can be achieved.

[Another Embodiment]

In another embodiment, memory 102 or HDD 110 in image processing apparatus MFP stores a result of the classification provided from CPU 100. CPU 100 displays the compressed image on display 138 based on the result of classification. Alternatively, CPU 100 causes printer 116 to print the compressed image.

An external device of image processing apparatus MFP may store the result of classification provided from CPU 100. An external device of image processing apparatus MFP may display the compressed image based on the result of classification. An external device of image processing apparatus MFP may print the compressed image based on the result of classification. Thus, the image processing apparatus may not have the storage function, print function and display function.

Figure 14:
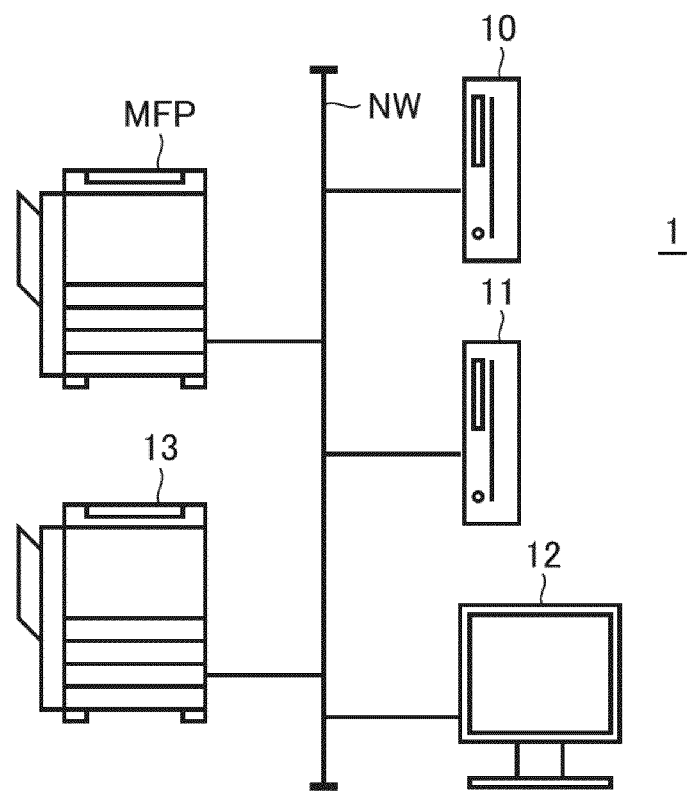
FIG. 14 is a conceptual view showing an image processing system including the image processing apparatus.

In the following description, image processing apparatus MFP described above or an image processing apparatus 10 that does not have the storage function and the printer function forms a part of an image processing system 1. FIG. 14 is a conceptual view showing image processing system 1 including image processing apparatus MFP (10).

As shown in FIG. 14, image processing system 1 includes image processing apparatus MFP (10), a storage device 11, a display device 12 and a printer device 13. Image processing apparatus MFP (10), storage device 11, display device 12 and printer device 13 are configured to allow mutual transmission and reception of the image data and the compressed data (classification result) over network NW. Network NW is formed of a dedicated line such as a LAN (Local Area Network) or a WAN (Wide Area Network), and/or a public line such as the Internet, a virtual private network or the like. Further, it may be partially or entirely formed of a radio communication line such as a radio LAN.

Storage device 11 receives the result of classification from image processing apparatus MFP (10) over network NW, and internally stores the result of classification.

Display device 12 receives the result of classification from image processing apparatus MFP (10) over network NW, and displays the image based on the result of classification.

Printer device 13 receives the result of classification from image processing apparatus MFP (10) over network NW, and prints the image based on the result of classification.

Thus, image processing apparatus MFP, storage device 11, display device 12, printer device 13 and the like may be integrated as one apparatus, or may be connected together over the network to implement the system.

The program according to the invention may be configured to execute the processing by calling required program modules from among those provided as a part of an Operating System (OS) of the computer according to a predetermined order and predetermined timing. In this case, the program itself does not include the above modules, and cooperates with the OS to execute the processing. This kind of program not including the module is also the program according to the invention.

The program according to the invention may be incorporated into a different program for providing it. In this case, the program itself does not include the modules included in the above different program, and cooperates with the different program to execute the processing. This kind of program incorporated into the different program is also the program according to the invention.

The provided program product is installed on a program storage unit such as a hard disk for executing it. The program product includes the program itself and the record medium storing the program.

The function implemented by the program according to the invention may be partially or entirely formed of dedicated hardware.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An image processing apparatus for performing color classification of image data by classifying a plurality of picture elements into a predetermined number of baskets, comprising:
   a memory for storing color data of each of said plurality of picture elements together with a correlation to identification information for identifying each of said plurality of picture elements, and storing a reference value and a statistical value for each of said predetermined number of baskets;
   a classifying unit for classifying each of said plurality of picture elements into one of said baskets based on said color data and said reference value corresponding to said basket;
   a calculating unit for calculating the statistical value and the reference value of the basket accommodating the classified picture element based on said color data corresponding to the picture element; and
   a determining unit for determining a representative color of each of said baskets based on said statistical value, and outputting the representative color of each of said baskets and a result of the classification of each of said picture elements.

2. The image processing apparatus according to claim 1, wherein
   said calculating unit calculates the statistical value and the reference value of said basket containing a new classified picture element based on the color data of said picture element newly classified into said basket as well as the statistical value and the reference value corresponding to said plurality of picture elements already classified into said basket.

3. The image processing apparatus according to claim 1, wherein
   said classifying unit includes:
   a first determining unit for determining, for each of said plurality of picture elements, whether said color data is to be classified into one of said baskets or not, based on the reference value of said one of the baskets,
   a second determining unit for determining whether said basket not yet correlated to the reference value is present or not, when said color data is not classified into any one of said baskets,
   a calculating unit for calculating a distance between the reference values and a distance between the reference value and the color data, when all the baskets are correlated to the reference values, and
   a coupling unit for coupling the two baskets together corresponding to the distance between the reference values when said distance between the reference values is the smallest of said distances, wherein
   said classifying unit operates:
   when said color data is to be classified into any one of the baskets, to classify the picture element in question into said basket corresponding to said reference value,
   when the basket not correlated to the reference value is present, to classify the picture element in question into said basket, and
   when the distance between the reference value and the color data is the smallest of said distances, to classify the picture element in question into the basket corresponding to said distance.

4. The image processing apparatus according to claim 1, wherein
   said image data includes the plurality of blocks containing the plurality of picture elements,
   said memory stores temporary information about said predetermined number of baskets per block, and
   said classifying unit successively classifies the picture elements along a line extending through said plurality of blocks based on said corresponding temporary information.

5. The image processing apparatus according to claim 4, wherein
   said memory stores said temporary information relating to a first line in a first block forming said image data while said classifying unit is classifying the picture elements in the first line in a second block forming said image data.

6. The image processing apparatus according to claim 5, wherein
   said memory stores, as said temporary information, the basket of the classification destination corresponding to said identification information as well as the reference value and the statistical value of each of said predetermined number of baskets.

7. The image processing apparatus according to claim 5, wherein
   said memory stores, as said temporary information, the basket of the classification destination corresponding to the identification information used for identifying each of said plurality of picture elements as well as the statistical value of each of said predetermined number of baskets, and
   said classifying unit calculates the reference value for each of said predetermined number of baskets, based on said statistical value when the classification of the picture elements in the second line in said first block is to be performed.

8. The image processing apparatus according to claim 5, wherein
said memory stores, as said temporary information, the basket of the classification destination corresponding to the identification information used for identifying each of said plurality of picture elements as well as the statistical value of each of said predetermined number of baskets, and
said classifying unit calculates the statistical value for each of said predetermined number of baskets, based on said reference value when the classification of the picture elements in the second line in said first block is to be performed.

9. The image processing apparatus according to claim 1, wherein
the statistical value relating to each of said predetermined number of baskets includes a minimum value and a maximum value of the color data of the picture elements classified into said basket.

10. The image processing apparatus according to claim 1, wherein
the statistical value relating to each of said predetermined number of baskets includes a cumulative total of the color data of the picture elements classified into said basket.

11. The image processing apparatus according to claim 1, wherein
the statistical value relating to each of said predetermined number of baskets includes an average of the color data of the picture elements classified into said basket.

12. The image processing apparatus according to claim 1, wherein
the statistical value relating to each of said predetermined number of baskets includes a maximum value and a minimum value of the color data of the picture elements classified into said basket.

13. The image processing apparatus according to claim 1, wherein
said memory stores a representative color of each of said baskets and a result of the classification of said picture elements.

14. The image processing apparatus according to claim 1, further comprising:
a reproducing unit for reproducing the image based on the representative color of each of said baskets and the result of the classification of each of said picture elements.

15. An image processing system comprising:
the image processing apparatus according to claim 1; and
an image recording device for storing the representative color of each of said baskets and the result of the classification of each of said picture elements provided from said image processing apparatus.

16. An image processing system comprising:
the image processing apparatus according to claim 1; and
an image reproducing device for reproducing an image based on the representative color of each of said baskets and the result of the classification of each of said picture elements provided from said image processing apparatus.

17. An image processing system comprising:
the image processing apparatus according to claim 1;
an image recording device for storing the representative color of each of said baskets and the result of the classification of each of said picture elements provided from said image processing apparatus; and
an image reproducing device for reproducing an image based on the representative color of each of said baskets and the result of the classification of each of said picture elements provided from said image processing apparatus.

18. An image processing method in an image processing apparatus including a memory and a processor, comprising the steps of:
storing, by said processor, in said memory, color data of each of a plurality of picture elements together with a correlation to identification information for identifying each of said plurality of picture elements;
storing, by said processor, in said memory, a reference value and a statistical value for each of said predetermined number of baskets;
classifying, by said processor, each of said plurality of picture elements into one of said baskets based on said color data and said reference value corresponding to said basket;
calculating, by said processor, the statistical value and the reference value of the basket accommodating the classified picture element based on said color data corresponding to the picture element;
determining, by said processor, a representative color of each of said baskets based on said statistical value; and
outputting, by said processor, the representative color of each of said baskets and a result of the classification of each of said picture elements.

19. A non-transitory computer-readable recording medium storing an image processing program for causing an image processing apparatus including a memory and a processor to perform image processing, said image processing program causing said processor to execute the steps of:
storing, in said memory, color data of each of a plurality of picture elements together with a correlation to identification information for identifying each of said plurality of picture elements;
storing, in said memory, a reference value and a statistical value for each of said predetermined number of baskets;
classifying each of said plurality of picture elements into one of said baskets based on said color data and said reference value corresponding to said basket;
calculating the statistical value and the reference value of the basket accommodating the classified picture element based on said color data corresponding to the picture element;
determining a representative color of each of said baskets based on said statistical value; and
outputting the representative color of each of said baskets and a result of the classification of each of said picture elements.

* * * * *